(12) United States Patent
Kudo et al.

(10) Patent No.: US 10,494,726 B2
(45) Date of Patent: Dec. 3, 2019

(54) ELECTROLYTIC DEVICE

(71) Applicant: KABUSHIKI KAISHA TOSHIBA, Minato-ku (JP)

(72) Inventors: Yuki Kudo, Yokohama (JP); Satoshi Mikoshiba, Yamato (JP); Akihiko Ono, Kita (JP); Jun Tamura, Chuo (JP); Ryota Kitagawa, Setagaya (JP); Masakazu Yamagiwa, Yokohama (JP); Yoshitsune Sugano, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 158 days.

(21) Appl. No.: 15/251,767

(22) Filed: Aug. 30, 2016

(65) Prior Publication Data

US 2017/0073822 A1 Mar. 16, 2017

(30) Foreign Application Priority Data

Sep. 11, 2015 (JP) ................................. 2015-179370

(51) Int. Cl.
*C25B 3/04* (2006.01)
*C25B 1/04* (2006.01)
(Continued)

(52) U.S. Cl.
CPC .................. *C25B 3/04* (2013.01); *C25B 1/04* (2013.01); *C25B 9/08* (2013.01); *C25B 11/035* (2013.01); *Y02E 60/366* (2013.01)

(58) Field of Classification Search
CPC .. C25B 1/00; C25B 1/003; C25B 1/04; C25B 3/04; C25B 9/08; C25B 9/18;
(Continued)

(56) References Cited

U.S. PATENT DOCUMENTS 4,908,114 A 3/1990 Ayers
2009/0246572 A1* 10/2009 Dahlberg ............... B01J 21/063
429/449

(Continued)

FOREIGN PATENT DOCUMENTS

JP 62-280385 12/1987
JP 4-314881 11/1992
(Continued)

OTHER PUBLICATIONS

Christina W. Li et al. "Electroreduction of carbon monoxide to liquid fuel on oxide-derived nanocrystalline copper", Nature, 508, 2014, 17 pages.

(Continued)

*Primary Examiner* — Ciel P Thomas
(74) *Attorney, Agent, or Firm* — Oblon, McClelland, Maier & Neustadt, L.L.P.

(57) ABSTRACT

An electrolytic device of an embodiment has a solution or gas containing water and carbon dioxide, a first electrode oxidizing the water to produce oxygen, a second electrode and a third electrode reducing the carbon dioxide to produce a carbon compound, and a power supply applying current across the first electrode and the second and third electrodes. A composing material of the second electrode has an ionization tendency larger than a composing material of the third electrode. The third electrode mainly reduces the carbon dioxide to produce a first carbon compound, and the second electrode mainly reduces the first carbon compound to produce a second carbon compound.

14 Claims, 12 Drawing Sheets

(51) Int. Cl.
*C25B 11/03* (2006.01)
*C25B 9/08* (2006.01)

(58) Field of Classification Search
CPC .............. C25B 11/035; C25B 11/0404; C25B 11/0447; C25B 11/0452; C25B 11/0473; C25B 13/08; C25B 1/08; C25B 1/10; C25B 9/10; C25B 15/08; Y02E 10/542; Y02E 60/366; Y02E 70/10; H01G 9/2013; H01G 9/2004; H01G 9/2068; Y02P 20/135

See application file for complete search history.

(56) References Cited

U.S. PATENT DOCUMENTS

2012/0228146 A1\* 9/2012 Deguchi .................. C25B 1/00
205/340
2016/0076158 A1 3/2016 Tamura et al.

FOREIGN PATENT DOCUMENTS

| JP | 2009-540130 | 11/2009 |
| JP | 2010-255018 | 11/2010 |
| JP | 2015-132012 A | 7/2015 |
| WO | WO 2012/077199 A1 | 6/2012 |

OTHER PUBLICATIONS

Y. Hori "Electrochemical $CO_2$ Reduction on Metal Electrodes", Modern Aspect of Electrochemistry, No. 42, 2008, 101 pages.

\* cited by examiner

ELECTROLYTIC DEVICE

CROSS REFERENCE TO RELATED APPLICATION

This application is based upon and claims the benefit of priority from Japanese Patent Application No. 2015-179370 filed on Sep. 11, 2015; the entire contents of which are incorporated herein by reference.

FIELD

Embodiments disclosed herein generally relate to an electrolytic device.

BACKGROUND

In recent years, depletion of fossil fuel such as petroleum and coal is concerned, and expectations for sustainable renewable energy are increasing. Examples of the renewable energy include solar cells, wind power generation, and the like. The amount of power generated by them depends on weather and nature conditions, and thus they have a problem of difficulty in stable supply of power. Accordingly, there are attempts to store electric power generated by the renewable energy in a storage battery, so as to stabilize the electric power. However, when the power is to be stored, there are problems such as requiring costs for storage batteries, and occurrence of loss while storing the power.

For such points, techniques are gaining attention to use power generated by renewable energy to electrolyze water, so as to produce hydrogen ($H_2$) from water, or electrochemically reduce carbon dioxide ($CO_2$) to convert it into chemical substances (chemical energy) such as carbon monoxide (CO), formic acid (HCOOH), methanol ($CH_3OH$), methane ($CH_4$), ethanol ($C_2H_5OH$), ethane ($C_2H_6$), ethylene ($C_2H_4$), and the like. When these chemical substances are stored in a cylinder or a tank, there are advantages that storage costs of energy can be reduced as compared to the case where the power (electric energy) is stored in a storage battery, and that storage loss is small.

A typical electrolytic device for carbon dioxide is a device having an electrolytic bath accommodating an electrolytic solution containing water ($H_2O$) and carbon dioxide ($CO_2$), and an anode (oxidation electrode) and a cathode (reduction electrode) which are immersed in an electrolytic solution. When hydrocarbon or the like is produced by an electrolytic reaction of carbon dioxide, a metal electrode of copper, copper alloy, or the like is used for the cathode. When the conventional electrolytic device is used, for substances having a small number of electrons used for a reduction reaction of carbon dioxide, such as carbon monoxide or formic acid, a good amount of production is obtained. On the other hand, for substances having a large number of electrons used for a reduction reaction of carbon dioxide, such as ethanol, ethane, ethylene, methanol, or methane, the amount of production is small in the current situation. The substances such as ethanol, ethylene, ethane, methanol, and methane are of high usefulness compared to carbon monoxide, and thus there are demands for increasing the amount of production of these substances as a reduction product of carbon dioxide.

DETAILED DESCRIPTION

Figure 1:
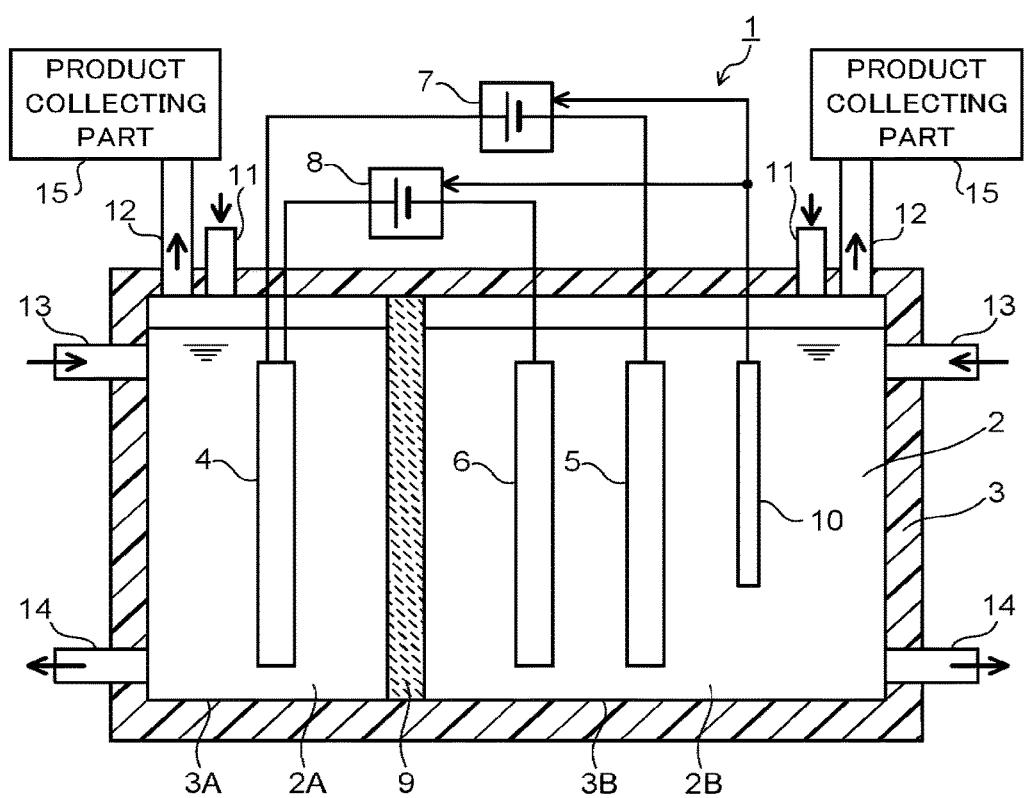
FIG. 1 is a diagram illustrating an electrolytic device according to a first embodiment.

According to one embodiment, there is provided an electrolytic device including: a solution or gas containing water; a solution or gas containing carbon dioxide; a first electrode oxidizing the water to produce oxygen; a second electrode and a third electrode reducing the carbon dioxide to produce a carbon compound; and a power supply applying current across the first electrode and the second and third electrodes. In the electrolytic device of the embodiment, a composing material of the second electrode has an ionization tendency larger than a composing material of the third electrode. The third electrode mainly reduces the carbon dioxide to produce a first carbon compound, and the second electrode mainly reduces the first carbon compound to produce a second carbon compound.

Hereinafter, an electrolytic device of an embodiment will be explained with reference to drawings. Note that in each embodiment, substantially the same composing members are denoted by the same reference numerals, and part of descriptions thereof may be omitted. The drawings are schematic, and the relation between the thicknesses of parts and planar dimensions, and the ratio of thicknesses, and so on of the parts may be different from actual ones.

First Embodiment

FIG. 1 is a diagram illustrating an electrolytic device 1 according to a first embodiment. The electrolytic device 1 illustrated in FIG. 1 has an electrolytic bath 3 accommodating an electrolytic solution 2 containing water ($H_2O$) and carbon dioxide ($CO_2$), a first electrode 4, a second electrode 5, a third electrode 6, a first power supply 7, and a second power supply 8. The first to third electrodes 4 to 6 are disposed in the electrolytic bath 3 and immersed in the electrolytic solution 2. The first and second power supplies 7, 8 are disposed outside the electrolytic bath 3. The first power supply 7 is connected to the first electrode 4 and the second electrode 5, and the second power supply 8 is connected to the first electrode 4 and the third electrode 6.

The electrolytic bath 3 is separated into two chambers by an ion migration layer (ion migration layer combining a separation wall) 9 capable of allowing migration of ions. The electrolytic bath 3 separated into two chambers has a first accommodating part 3A accommodating a first electrolytic solution 2A in which the first electrode 4 is immersed, and a second accommodating part 3B accommodating a second electrolytic solution 2B in which the second and third electrodes 5, 6 are immersed. The first electrode 4 is disposed in the first accommodating part 3A, and the second and third electrodes 5, 6 are disposed in the second accommodating part 3B. In the second accommodating part 3B, a reference electrode 10 is disposed, which controls current flowing across the first electrode 4 and the second electrode 5 and a potential of the second electrode 5, or current flowing across the first electrode 4 and the third electrode 6 and a potential of the third electrode 6. The reference electrode 10 is disposed as necessary.

The ion migration layer 9 is constituted of an ion exchange membrane or the like which can move ions between the first electrode 4 and the second and third electrodes 5, 6, and can separate the first electrolytic solution 2A and the second electrolytic solution 2B. As the ion exchange membrane, it is possible to use, for example, a cation exchange membrane such as Nafion or Flemion, or an anion exchange membrane such as Neosepta or Selemion. Besides them, any material can be used as the ion migration layer 9 as long as it is capable of moving ions between the first electrode 4 and the second and third electrodes 5, 6. To the electrolytic bath 3, a conduit 11 and a discharge pipe 12 for gas, and a conduit 13 and a discharge pipe 14 for solution are connected. They are provided in each of the first accommodating part 3A and the second accommodating part 3B. The discharge pipe 12 for gas is connected to a collecting part 15 for product produced by an oxidation-reduction reaction.

The first electrode 4 is an electrode causing an oxidation reaction of water ($H_2O$) in the electrolytic solution 2 to produce oxygen ($O_2$) and hydrogen ions ($H^+$). The second and third electrodes 5, 6 are electrodes causing a reduction reaction of carbon dioxide ($CO_2$) in the electrolytic solution 2 and a reduction reaction of carbon compound obtained thereby, so as to produce a carbon compound (CO, $C_2H_5OH$, $C_2H_6$, $C_2H_4$, $CH_3OH$, $CH_4$, or the like). The second and third electrodes 5, 6 can also cause a reduction reaction of water at the same time as the reduction reaction of carbon dioxide, so as to produce hydrogen ($H_2$).

In order to cause an oxidation reaction by the first electrode 4, the first electrode 4 is connected to the positive electrodes (+) of the first power supply 7 and the second power supply 8. In order to cause a reduction reaction by the second and third electrodes 5, 6, the second and third electrodes 5, 6 are connected to the respective negative electrodes (−) of the first power supply 7 and the second power supply 8. The currents supplied from the first and second power supplies 7, 8 are controlled individually, and may be of the same current amount or different current amounts. There may be provided a mechanism to monitor the amount of substance produced by the second electrode 5, and control the first and second power supplies 7, 8. The power supplies 7, 8 may be ones that supply electric power generated with renewable energy of solar cells and wind power generation, and the like.

Figure 2:
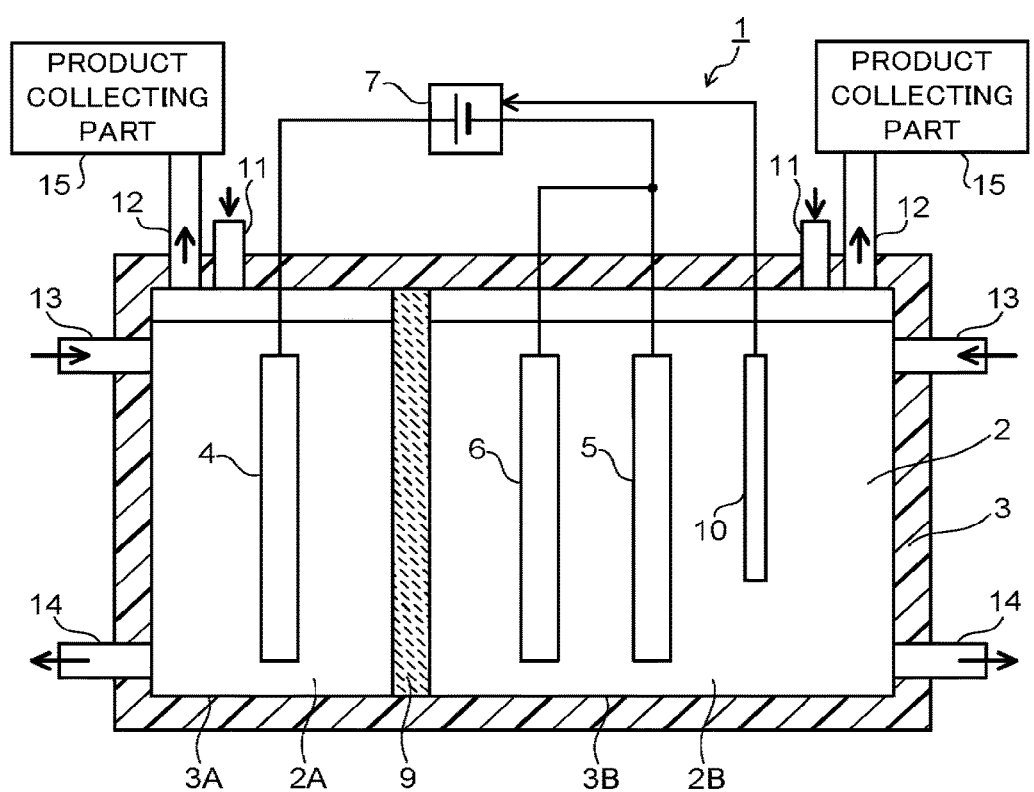
FIG. 2 is a diagram illustrating a first modification example of the electrolytic device according to the first embodiment.

The electrolytic device 1 of the first embodiment may have one power supply 7 as illustrated in FIG. 2. The electrolytic device 1 illustrated in FIG. 2 has the first power supply 7 connected to the first electrode 4 and the second electrode 5. The third electrode 6 is electrically connected to the second electrode 5 via a conductive member. The first electrode 4 is connected to the positive electrode (+) of the first power supply 7, and the second and third electrodes 5, 6 are connected to the negative electrode (−) of the first power supply 7. The second and third electrodes 5, 6 are supplied with current from the first power supply 7. The current flowing through the second and third electrodes 5, 6 are controlled by an electrode material, an electrode area, an electrode shape, and the like. By thus having one power supply 7 of the electrolytic device 1, power loss by the first power supply 7 can be reduced.

The first electrode 4 is preferably constituted of a material capable of oxidizing water to produce oxygen and hydrogen ions, and reduce an excess voltage of such a reaction. Examples of such material includes metals such as platinum (Pt), palladium (Pd), and nickel (Ni), alloys and intermetallic compounds containing these metals, binary metal oxides such as manganese oxide (Mn—O), iridium oxide (Ir—O), nickel oxide (Ni—O), cobalt oxide (Co—O), iron oxide (Fe—O), tin oxide (Sn—O), indium oxide (In—O), and ruthenium oxide (Ru—O), ternary metal oxides such as Ni—Co—O, Ni—Fe—O, La—Co—O, Ni—La—O, and Sr—Fe—O, quaternary metal oxides such as Pb—Ru—Ir—O, and La—Sr—Co—O, metal complexes such as Ru complex and Fe complex, and the like. For the first electrode 4, various shapes such as plate, mesh, wire, particulate, porous, thin film, island, and the like can be employed. For the first electrode 4, a complex electrode in which these materials are stacked on a substrate may be used.

The second and third electrodes 5, 6 are preferably constituted of a material capable of reducing carbon dioxide to produce carbon compounds, and decreasing an overvoltage of such reaction. Examples of such materials include metals such as copper (Cu), silver (Ag), gold (Au), platinum (Pt), palladium (Pd), nickel (Ni), cobalt (Co), iron (Fe), manganese (Mn), titanium (Ti), cadmium (Cd), zinc (Zn), indium (In), gallium (Ga), lead (Pb), and tin (Sn), alloys and intermetallic compounds containing these metals, carbon materials such as carbon (C), graphene, CNT (carbon nanotube), fullerene, and ketjen black, metal complexes such as Ru complex and Fe complex, and the like. For the second and third electrodes 5, 6, various shapes such as plate, mesh, wire, particulate, porous, thin film, island, and the like can be employed. For the second and third electrodes 5, 6, composite electrodes made by stacking these materials on a substrate may be used.

Out of the second and third electrodes 5, 6, the third electrode 6 is an electrode mainly causing a reduction reaction of carbon dioxide ($CO_2$), and producing a first carbon compound having a small number of electrons (number of reaction electrons) used for reduction reaction of carbon dioxide. The second electrode 5 is an electrode mainly causing a reduction reaction of the first carbon compound produced by the third electrode 6, and producing a second carbon compound having a large number of electrons (number of reaction electrons) used for reduction reaction of carbon dioxide. Note that the second and third electrodes 5, 6 also cause a reduction reaction from carbon dioxide to the second carbon compound. The number of electrons used for reduction reaction producing the first carbon compound from carbon dioxide is smaller than the number of electrons used for reduction reaction producing the second carbon compound from carbon dioxide. By applying such reduction reaction of carbon dioxide in two steps, the amount of production of the second carbon compound (carbon compound by multielectron reduction reaction) having a large number of reduced reaction electrons of carbon dioxide can be increased.

Examples of the first carbon compound include carbon monoxide (CO), formic acid (HCOOH) and the like whose number of reduced reaction electrons of carbon dioxide is 2. The first carbon compound may also be formaldehyde (HCHO) or acetaldehyde ($CH_3CHO$). Examples of the second carbon compound include ethanol ($C_2H_5OH$) whose number of reduced reaction electrons of carbon dioxide is 12, ethylene ($C_2H_4$) whose number of reduced reaction electrons is 12, ethane ($C_2H_6$) whose number of reduced reaction electrons is 14, methanol ($CH_3OH$) whose number of reduced reaction electrons is 6, methane ($CH_4$) whose number of reduced reaction electrons is 8, acetic acid ($CH_3COOH$) whose number of reduced reaction electrons is 8, propanol ($C_3H_7OH$) whose number of reduced reaction electrons is 18, ethylene glycol ($C_2H_4(OH)_2$) whose number of reduced reaction electrons is 10, and the like. By increasing the amount of production of the second carbon compound, usefulness of the electrolytic device 1 of carbon dioxide can be increased. Table 1 provides the numbers of reduced reaction electrons of carbon dioxide ($CO_2$) and carbon monoxide (CO) together.

TABLE 1

|  | NUMBER OF REDUCED REACTION ELECTRONS OF $CO_2$ | NUMBER OF REDUCED REACTION ELECTRONS OF CO |
|---|---|---|
| CARBON MONOXIDE (CO) | 2 | — |
| FORMIC ACID | 2 | — |
| ETHANOL | 12 | 8 |
| ETHYLENE | 12 | 8 |
| ETHANE | 14 | 10 |
| METHANE | 8 | 6 |
| METHANOL | 6 | 4 |
| ACETIC ACID | 8 | 4 |
| n-PROPANOL | 18 | 12 |
| ETHYLENE GLYCOL | 10 | 6 |

As described above, in order for the third electrode 6 to mainly cause reduction reaction of carbon dioxide and for the second electrode 5 to mainly cause reduction reaction of the first carbon compound, the third electrode 6 is constituted of a material which easily cause production of the first carbon compound having a small number of reduced reaction electrons of carbon dioxide, and the second electrode 5 is constituted of a material which easily cause production of the second carbon compound having a large number of reduced reaction electrons of carbon dioxide. Specifically, the second electrode 5 is constituted of a material having an ionization tendency larger than that of the composing material of the third electrode 6. In order words, the third electrode 6 constituted of a material having an ionization tendency smaller than the composing material of the second electrode 5 is disposed together with the second electrode 5 in an electrolytic bath 3, the reduction reaction of carbon dioxide is caused mainly by the third electrode 6, and the reduction reaction of the first carbon compound produced by the third electrode 6 is caused mainly by the second electrode 5 so as to produce the second carbon compound.

As the composing material of the third electrode 6, it is preferred to use a material having a small ionization tendency, for example a material containing at least one selected from, for example, gold, silver, platinum, and palladium, or specifically these metals, an alloy or intermetallic compound containing at least one of them. As the composing material of the third electrode 6, for example, a carbon material may be used instead of the above-described metal materials. Moreover, for the third electrode 6, it is preferred to use a material containing at least one selected from gold and silver capable of efficiently producing carbon monoxide or formic acid whose number of reduced reaction electrons of carbon dioxide is 2, particularly carbon monoxide, or specifically these metals, an alloy or intermetallic compound containing at least one of them.

As the composing material of the second electrode 5, it is preferred to use a material having a relatively large ionization tendency, for example, a material containing at least one selected from copper, nickel, zinc, indium, and tin, or specifically these metals, an alloy or intermetallic compound containing at least one of them. Moreover, for the second electrode 5, it is preferred to use a material containing copper as a material that easily causes a multielectron reduction reaction of carbon dioxide or carbon monoxide, or specifically copper, an alloy or intermetallic compound containing copper. Use of the above-described material as the composing material of the second and third electrodes 5, 6 enables to produce the first carbon compound from carbon dioxide, and moreover facilitates proceeding of the two-step reduction reaction of carbon dioxide to produce the second carbon compound from the first carbon compound.

Figure 3:
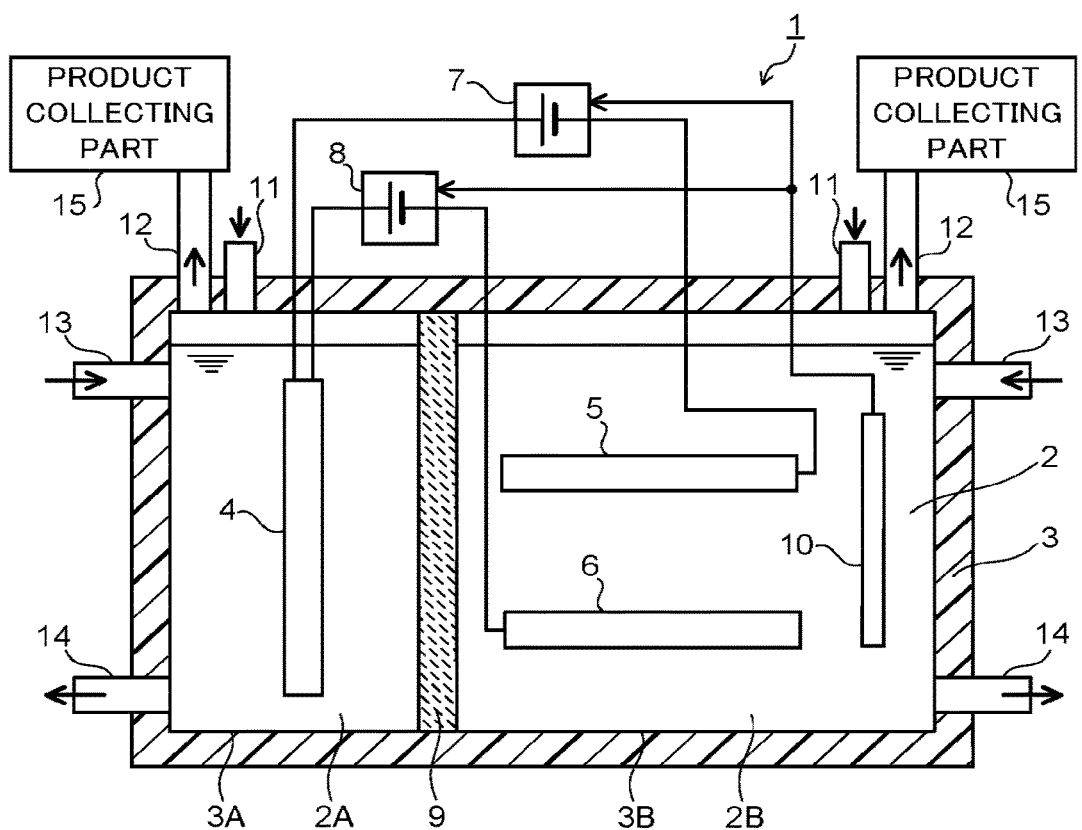
FIG. 3 is a diagram illustrating a second modification example of the electrolytic device according to the first embodiment.

In order to make the first carbon compound produced by the third electrode 6 efficiently reach the second electrode 5, the second electrode 5 is preferably disposed in the vicinity of the third electrode 6. The distance between the second electrode 5 and the third electrode 6 is preferably 20 mm or less, more preferably 10 mm or less. In order to make the first carbon compound produced by the third electrode 6 efficiently move to the second electrode 5, the third electrode 6 preferably has a movement path of electrolytic solution such as mesh or porous. In order to increase production efficiency of the second carbon compound, the second electrode 5 preferably has a larger area than the third electrode 6. When the first carbon compound produced by the third electrode 6 is gaseous substance like carbon monoxide, the second electrode 5 is preferably provided in a direction in which the gaseous substance moves from the third electrode 6. FIG. 3 illustrates an example of disposing the second electrode 5 above the third electrode 6. Application of such arrangement structure of the electrodes 5, 6 makes the gaseous substrate like carbon monoxide produced by the third electrode 6 efficiently reach the second electrode 5.

Figure 4:
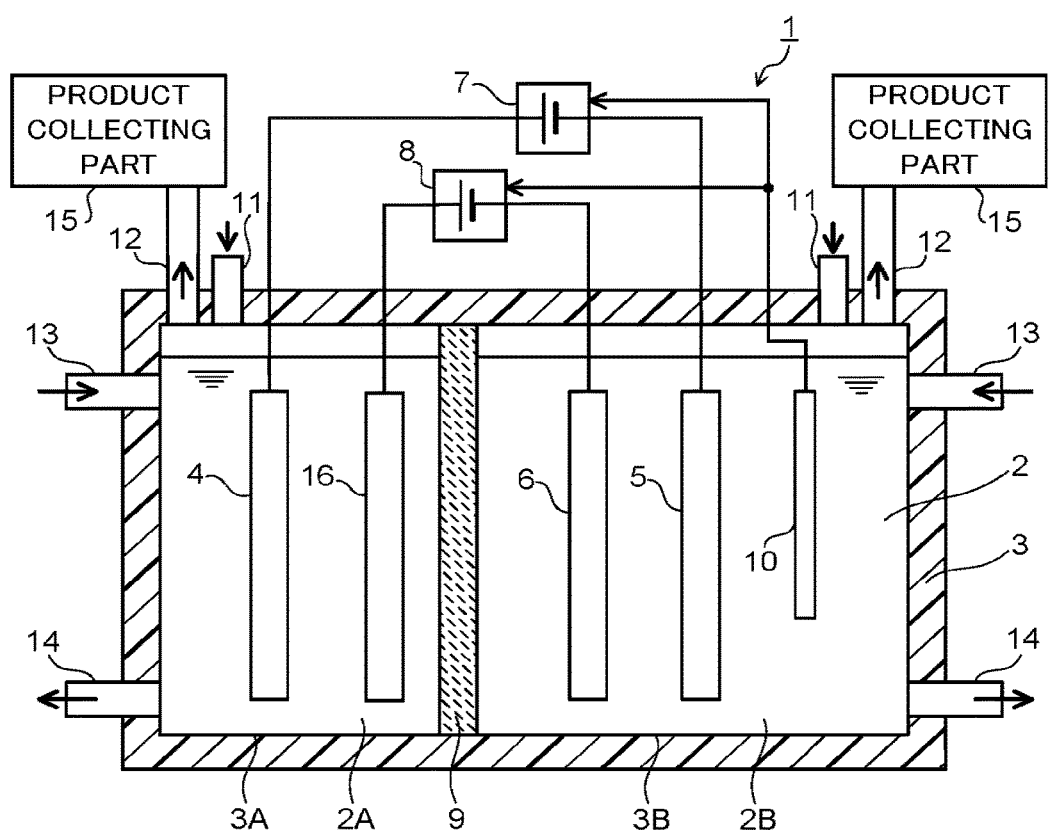
FIG. 4 is a diagram illustrating a third modification example of the electrolytic device according to the first embodiment.

The electrolytic device 1 of the first embodiment may have a fourth electrode 16 as illustrated in FIG. 4. The electrolytic device 1 illustrated in FIG. 4 has a first electrode 4 and a second electrode 5 connected to the first power supply 7, and a fourth electrode 16 and a third electrode 6 connected to a second power supply 8. Specifically, in the first electrolytic solution 2A accommodated in the first accommodating part 3A of the electrolytic bath 3, the fourth electrode 16 is immersed in addition to the first electrode 4. The fourth electrode 16 is an electrode causing an oxidation reaction of water to produce oxygen or hydrogen ions similarly to the first electrode 4. The fourth electrode 16 is preferred to be constituted of a material similar to the first electrode 4. In this manner, separated electrode pairs (the first electrode 4 and the second electrode 5, the fourth electrode 16 and the third electrode 6) for every power supply 7, 8 allow enlarging the control range of current by each power supply 7, 8.

The first electrolytic solution 2A is a solution containing at least water ($H_2O$), and the second electrolytic solution 2B is a solution containing at least carbon dioxide ($CO_2$). The same solution or different solutions may be applied to the first electrolytic solution 2A and the second electrolytic solution 2B. When the same solution is applied to the first electrolytic solution 2A and the second electrolytic solution 2B, a one-solution type electrolytic bath 3 may be applied.

As the solution containing $H_2O$, for example, an aqueous solution containing any electrolytes is used. This solution is preferably an aqueous solution that facilitates an oxidation reaction of $H_2O$. The aqueous solution containing electrolytes may be, for example, an aqueous solution containing phosphoric acid ions ($PO_4^{2-}$), boric acid ions ($BO_3^{3-}$), hydrogen carbonate ions ($HCO_3^-$), lithium ions ($Li^+$), sodium ions ($Na^+$), potassium ions ($K^+$), cesium ions ($Cs^+$), calcium ions ($Ca^{2+}$), magnesium ions ($Mg^{2+}$), chloride ions ($Cl^-$), bromide ions ($Br^-$), iodide ions ($I^-$), hydroxide ions ($OH^-$), hydrogen ions ($H^+$), and/or the like.

The solution containing $CO_2$ is preferably a solution having high absorptance of $CO_2$, and examples of the solution may be an aqueous solution of $LiHCO_3$, $NaHCO_3$, $KHCO_3$, $CsHCO_3$, or the like. The solution containing $CO_2$ may contain phosphoric acid ions ($PO_4^{2-}$), boric acid ions ($BO_3^{3-}$), hydrogen carbonate ions ($HCO_3^-$), carbonate ions ($CO_3^{2-}$), lithium ions ($Li^+$), sodium ions ($Na^+$), potassium ions ($K^+$), cesium ions ($Cs^+$), calcium ions ($Ca^{2+}$), magnesium ions ($Mg^{2+}$), chloride ions ($Cl^-$), bromide ions ($Br^-$), iodide ions ($I^-$), hydroxide ions ($OH^-$), hydrogen ions ($H^+$), or the like as electrolytes for adjusting electric conductivity. For the solution containing $CO_2$, an alcohol such as methanol, ethanol, or acetone may be used. The solution containing $H_2O$ and the solution containing $CO_2$ may be the same solution. However, the solution containing $CO_2$ is preferred to absorb a larger amount of $CO_2$, and thus a solution different from the solution containing $H_2O$ may be used. The solution containing $CO_2$ is desirably an electrolytic solution decreasing the reduction potential of $CO_2$, having high ion conductivity and containing a $CO_2$ absorbent absorbing $CO_2$.

The above-described electrolytic solution may be an ionic liquid constituted of salt of cations such as imidazolium ions or pyridinium ions, and anions such as $BF_4^-$ or $PF_6^-$, and being in a liquid state in a wide temperature range, or an aqueous solution thereof. Another electrolytic solution may be an amine solution such as ethanolamine, imidazole, or pyridine, or an aqueous solution thereof. The amine may be any of primary amine, secondary amine, and tertiary amine. Examples of the primary amine include methylamine, ethylamine, propylamine, butylamine, pentylamine, hexylamine, or the like. A hydrocarbon of amine may be substituted with alcohol, halogen or the like. Examples of amines whose hydrocarbon is substituted include methanolamine, ethanolamine, chloromethyl amine, and the like. Further, an unsaturated bond may exist. These hydrocarbons are the same for the secondary amine and the tertiary amine. Examples of the secondary amine include dimethylamine, diethylamine, dipropylamine, dibutylamine, dipentylamine, dihexylamine, dimethanolamine, diethanolamine, dipropanolamine, and the like. The substituted hydrocarbons may be different. The same applies to the tertiary amine. Examples of ones with different hydrocarbons include methylethylamine, methylpropylamine, and the like. Examples of the tertiary amine include trimethylamine, triethylamine, tripropylamine, tributylamine, trihexylamine, trimethanolamine, triethanolamine, tripropanolamine, tributanolamine, triexanolamine, methyldiethylamine, methyldipropylamine, and the like. Examples of the cations of ionic liquid include 1-ethyl-3-methyl imidazolium ion, 1-methyl-3-propyl imidazolium ion, 1-butyl-3-methylimidazole ion, 1-methyl-3-pentylimidazolium ion, 1-hexyl-3-methylimidazolium ion, and the like. The second place of an imidazolium ion may be substituted. Examples of the imidazolium ion whose second place is substituted include 1-ethyl-2,3-dimethylimidazolium ion, 1,2-dimethyl propylimidazolium ion, 1-butyl-2,3-dimethylimidazolium ion, 1,2-dimethyl-3-pentylimidazolium ion, 1-hexyl-2,3-dimethylimidazolium ion, and the like. Examples of pyridinium ion include methylpyridinium, ethylpyridinium, propylpyridinium, butylpyridinium, pentylpyridinium, hexylpyridinium, and the like. In both the imidazolium ion and the pyridinium ion, an alkyl group may be substituted, or an unsaturated bond may exist. Examples of anion include a fluoride ion, chloride ion, bromide ion, iodide ion, $BF_4^-$, $PF_6^-$, $CF_3COO^-$, $CF_3SO_3^-$, $NO_3^-$, $SCN^-$, $(CF_3SO_2)_3C^-$, bis-(trifluoromethoxysulfonyl)imide, bis-(perfluoroethylsulfonyl)imide, and the like. It may be a dipolar ion such that a cation of the ionic liquid and an anion are coupled with a hydrocarbon.

Figure 5:
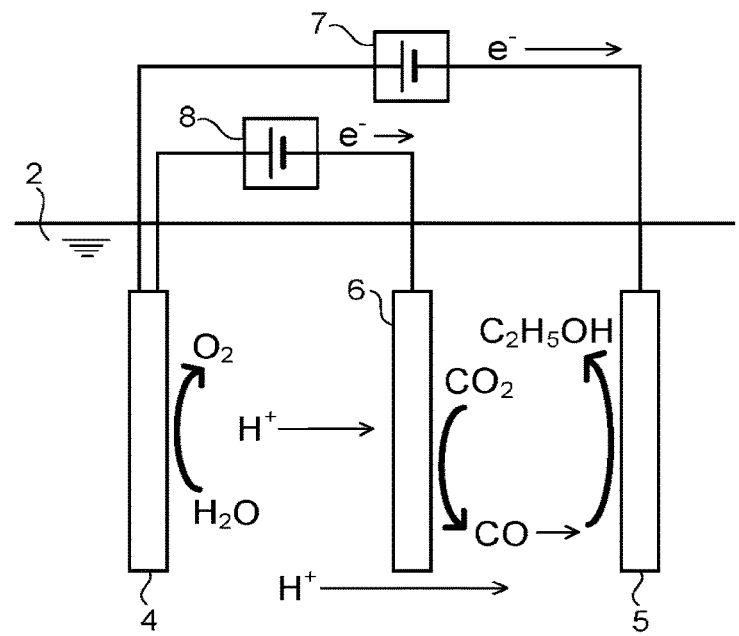
FIG. 5 is a diagram illustrating a first reaction process using the electrolytic device according to the first embodiment.
Figure 6:
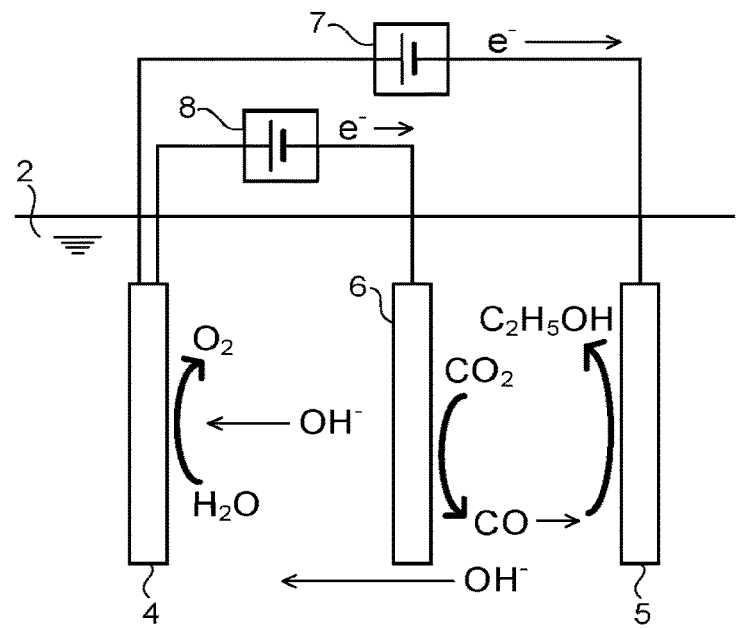
FIG. 6 is a diagram illustrating a second reaction process using the electrolytic device according to the first embodiment.

Next, operation of the electrolytic device 1 will be explained with reference to FIG. 5 and FIG. 6. It will be mainly described here the case where carbon monoxide (CO) is produced as the first carbon compound, and ethanol ($C_2H_5OH$) is produced as the second carbon compound. FIG. 5 illustrates a reaction process when hydrogen ions (H) are mainly produced, and FIG. 6 illustrates a reaction process when hydroxide ions ($OH^-$) are mainly produced.

First, a reaction process when water ($H_2O$) is oxidized to produce hydrogen ions ($H^+$) will be described with reference to FIG. 5. When the first and second power supplies 7, 8 (or the first power supply 7) supply current to the first electrode 4, an oxidation reaction of water ($H_2O$) occurs in the vicinity of the first electrode 4 in contact with the first electrolytic solution 2A. Specifically, as illustrated in a following formula (1A), $H_2O$ contained in the first electrolytic solution 2A is oxidized, so as to produce oxygen ($O_2$) and hydrogen ions ($H^+$).

$$2H_2O \rightarrow 4H^+ + O_2 + 4e^- \tag{1A}$$

H+ produced on the first electrode 4 side moves through the electrolytic solutions 2A, 2B, and reaches the vicinity of the second and third electrodes 5, 6. A reduction reaction of carbon dioxide ($CO_2$) occurs by the current (electrons $e^-$) supplied from the first and second power supplies 7, 8 (or the first power supply 7) to the second and third electrodes 5, 6 and by H+ moved to the vicinity of the second and third electrodes 5, 6.

In the reduction reaction process of $CO_2$, first, $CO_2$ contained in the second electrolytic solution 2B is reduced to produce CO as expressed in a following formula (2A) in the vicinity of the third electrode 6, which is constituted of a material having a smaller ionization tendency than the composing material of the second electrode 5, a small number of reduced reaction electrons of $CO_2$, and high production efficiency of CO. The number of reaction electrons at this time is 2.

$$2CO_2 + 4H^+ + 4e^- \rightarrow 2CO + 2H_2O \tag{2A}$$

The CO produced in the vicinity of the third electrode 6 moves through the electrolytic solution 2B and reaches the vicinity of the second electrode 5. Since the second electrode 5 is constituted of a material with high production efficiency of substances such as ethanol ($C_2H_5OH$) having a large number of reduced reaction electrons of $CO_2$, as expressed by a following formula (3A) in the vicinity of the second electrode 5, the CO is reduced to produce $C_2H_5OH$ and so on. The number of reaction electrons at this time is 8.

$$2CO_2+8H^++8e^- \rightarrow C_2H_5OH+H_2O \tag{3A}$$

Further, in the vicinity of the second electrode 5, a reduction reaction of $CO_2$ in the second electrolytic solution 2B simultaneously occurs as expressed by a following formula (4A). The number of reaction electrons at this time is 12.

$$2CO_2+12H^++12e^- \rightarrow C_2H_5OH+3H_2O \tag{4A}$$

As described above, producing $C_2H_5OH$ from CO can reduce the number of electrons needed for reduction reaction from 12 to 8 as compared to when $C_2H_5OH$ is produced from $CO_2$. Moreover, the reaction potential from CO to $C_2H_5OH$ is small as compared to the reaction potential from $CO_2$ to $C_2H_5OH$, reducing CO to produce $C_2H_5OH$ can increase production efficiency of $C_2H_5OH$. By them, $CO_2$ is reduced once to produce CO, and the produced CO is reduced to produce $C_2H_5OH$, thereby increasing the production efficiency and production amount of $C_2H_5OH$ as a reduction product of $CO_2$ can be increased.

In the vicinity of the second electrode 5, ethylene ($C_2H_4$), ethane ($C_2H_6$), methane ($CH_4$), methanol ($CH_3OH$), acetic acid ($CH_3COOH$), propanol ($C_3H_7OH$), and the like can be produced as expressed by following formulae (5A) to (10A).

$$2CO+8H^++8e^- \rightarrow C_2H_4+2H_2O \tag{5A}$$

$$2CO+10H^++10e^- \rightarrow C_2H_6+2H_2O \tag{6A}$$

$$CO+6H^++6e^- \rightarrow CH_4+H_2O \tag{7A}$$

$$CO+4H^++4e^- \rightarrow CH_3OH \tag{8A}$$

$$2CO+4H^++4e^- \rightarrow CH_3COOH \tag{9A}$$

$$3CO+12H^++12e^- \rightarrow C_3H_7OH+2H_2O \tag{10A}$$

Next, a reaction process when carbon dioxide ($CO_2$) is mainly reduced to produce hydroxide ions ($OH^-$) will be explained with reference to FIG. 6. When current is supplied from the second power supply 8 (or the first power supply 7) to the third electrode 6, water ($H_2O$) and carbon dioxide ($CO_2$) are reduced as expressed by a following formula (2B) in the vicinity of the third electrode 6 in contact with the second electrolytic solution 2B, thereby producing carbon monoxide (CO) and hydroxide ions ($OH^-$). The number of reaction electrons at this time is 2. The hydroxide ions ($OH^-$) diffuses to the vicinity of the first electrode 4, and oxygen ($O_2$) is produced as expressed by a following formula (1B).

$$2CO_2+2H_2O+4e^- \rightarrow 2CO+4OH^- \tag{2B}$$

$$4OH^- \rightarrow 2H_2O+O_2+4e^- \tag{1B}$$

The CO produced in the vicinity of the third electrode 6 moves through the electrolytic solution 2B and reaches the vicinity of the second electrode 5. In the vicinity of the second electrode 5, $C_2H_5OH$ and so on are produced from CO and $H_2O$ as expressed in the following (3B). The number of reaction electrons at this time is 8.

$$2CO+7H_2O+8e^- \rightarrow C_2H_5OH+8OH^- \tag{3B}$$

Further, a reduction reaction of $CO_2$ in the second electrolytic solution 2B simultaneously occurs as expressed in a following formula (4B) in the vicinity of the second electrode 5. The number of reaction electrons at this time is 12.

$$2CO+9H_2O+12e^- \rightarrow C_2H_5OH+12OH^- \tag{4B}$$

As described above, even when hydroxide ions ($OH^-$) are mainly produced, producing $C_2H_5OH$ from CO can reduce the necessary number of electrons for reduction reaction from 12 to 8 as compared to the case where $C_2H_5OH$ is produced from $CO_2$. Therefore, it becomes possible to increase the production efficiency and the production amount of $C_2H_5OH$ and so on as a reduction product of $CO_2$. In the vicinity of the second electrode 5, reduction products (organic chemical compounds) based on a reaction formula as expressed in following formulae (5B) to (10B) can be produced.

$$2CO+6H_2O+8e^- \rightarrow C_2H_4+8OH^- \tag{5B}$$

$$2CO+8H_2O+10e^- \rightarrow C_2H_6+10OH^- \tag{6B}$$

$$CO+5H_2O+6e^- \rightarrow CH_4+6OH^- \tag{7B}$$

$$CO+4H_2O+4e^- \rightarrow CH_3OH+4OH^- \tag{8B}$$

$$2CO+4H_2O+4e^- \rightarrow CH_3COOH+4OH^- \tag{9B}$$

$$3CO+10H_2O+12e^- \rightarrow C_3H_7OH+12OH^- \tag{10B}$$

Second Embodiment

Figure 7:
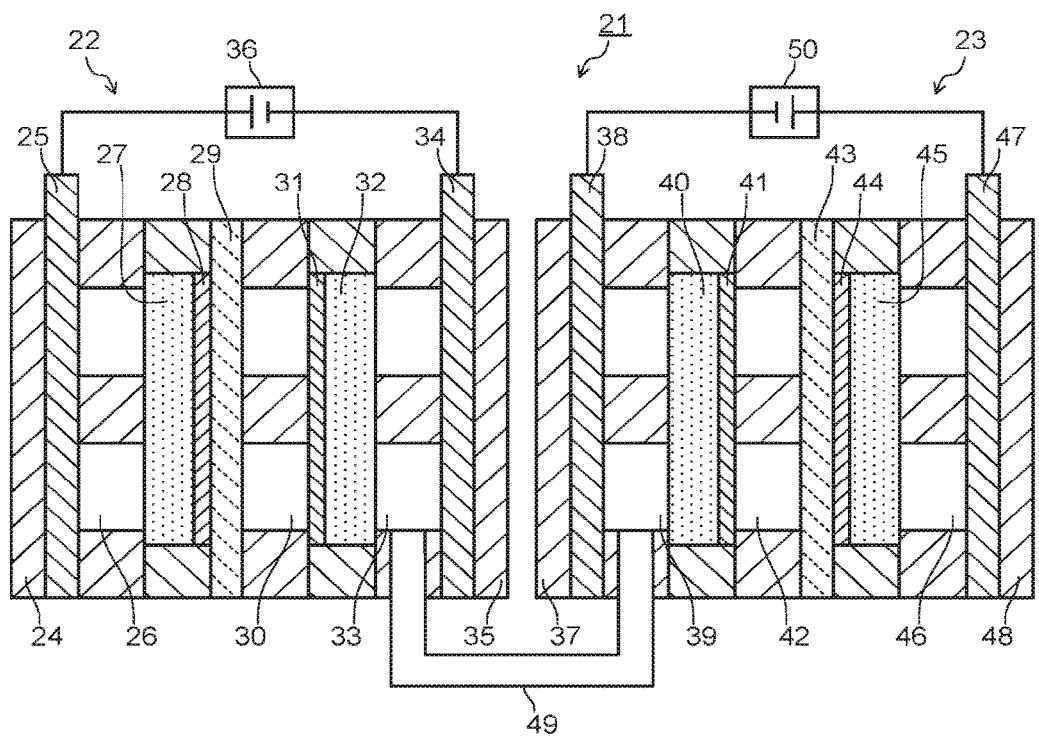
FIG. 7 is a diagram illustrating an electrolytic device according to a second embodiment.

An electrolytic device of a second embodiment will be explained with reference to FIG. 7 to FIG. 10. FIG. 7 is a diagram illustrating an electrolytic device 21 according to the second embodiment. Note that the electrolytic device 21 of the second embodiment differs in composing members and their shapes and the like of the electrolytic device 1 of the first embodiment, but is the same in electrode materials, electrolytic solutions, power supplies, and so on of the first embodiment.

The electrolytic device 21 illustrated in FIG. 7 has a first electrolytic part 22 and a second electrolytic part 23. The first electrolytic part 22 has a first support plate 24, a first collector plate 25, a first flow path 26, a first diffusion layer 27, a first electrode 28, a first ion exchange membrane 29, a second flow path 30, a third electrode 31, a third diffusion layer 32, a third flow path 33, a third collector plate 34, and a second support plate 35. The flow paths 26, 30, 33 can be provided with input-output ports for gas or solution, which are not illustrated.

The first support plate 24 and the second support plate 35 are used to sandwich the above-described composing members from both sides, so as to support a stacking structure of the composing members. The first collector plate 25 is used for applying current to the first electrode 28 via the first flow path 26 and the first diffusion layer 27. A solution or gas containing $H_2O$ is introduced into the first flow path 26. The solution or gas containing $H_2O$ is supplied to the first electrode 28 via the first diffusion layer 27.

The third collector plate 34 is used for applying current to the third electrode 31 via the third flow path 33 and the third diffusion layer 32. A solution or gas containing $CO_2$ is introduced into the third flow path 33. The solution or gas containing $CO_2$ is supplied to the third electrode 31 via the third diffusion layer 32. A solution containing $H_2O$ is introduced into the second flow path 30. The solution introduced into the second flow path 30 may contain $CO_2$.

Since $CO_2$ is supplied via the third diffusion layer 32, the solution introduced into the second flow path 30 need not contain $CO_2$. As a solution not containing $CO_2$, an aqueous solution containing $H_2O$, and phosphoric acid ions, boric acid ions, lithium ions, sodium ions, potassium ions, cesium ions, calcium ions, magnesium ions, chloride ions, bromide ions, iodide ions, hydroxide ions, hydrogen ions, or the like is used. The second flow path 30 is provided as necessary, and disposing thereof may be omitted. The first collector plate 25 and the third collector plate 34 are connected to a second power supply 36. Further, in order to control the current, a not-illustrated reference electrode may be provided in the first flow path 26 or the second flow path 30.

The second electrolytic part 23 has a third support plate 37, a second collector plate 38, a fourth flow path 39, a second diffusion layer 40, a second electrode 41, a fifth flow path 42, a second ion exchange membrane 43, a fourth electrode 44, a fourth diffusion layer 45, a sixth flow path 46, a fourth collector plate 47, and a fourth support plate 48. The flow paths 39, 42, 46 can each be provided with an input-output port for gas or solution, which is not illustrated.

The third support plate 37 and the fourth support plate 48 are used to sandwich the above-described composing members from both sides, so as to support a stacking structure of the composing members. The second collector plate 38 is used for applying current to the second electrode 41 via the fourth flow path 39 and the second diffusion layer 40. The fourth flow path 39 is connected to the third flow path 33 of the first electrolytic part 22 via a pipe 49. Gas containing substances, for example CO and $CO_2$, produced by reducing $CO_2$ in the first electrolytic part 22 is introduced into the fourth flow path 39. The gas containing CO and $CO_2$ is supplied to the second electrode 41 via the second diffusion layer 40.

The fourth collector plate 47 is used for applying current to the fourth electrode 44 via the sixth flow path 46 and the fourth diffusion layer 45. A solution or gas containing $H_2O$ is introduced into the sixth flow path 46. The solution or gas containing $H_2O$ is supplied to the fourth electrode 44 via the fourth diffusion layer 45. A solution containing $H_2O$ is introduced into the fifth flow path 42. The solution introduced into the fifth flow path 42 may contain $CO_2$. Since the gas containing CO and $CO_2$ is supplied via the second diffusion layer 40, the solution introduced into the fifth flow path 42 need not contain $CO_2$. The fifth flow path 42 is provided as necessary, and disposing this flow path may be omitted. The second collector plate 38 and the fourth collector plate 47 are connected to a first power supply 50. Further, in order to control the current, a not-illustrated reference electrode may be provided in the fifth flow path 42 or the six flow path 46.

Next, the operating principle of the electrolytic device 21 according to the second embodiment will be explained. The case where CO is mainly produced in the first electrolytic part 22 will be explained here. In the vicinity of the first electrode 28, $H_2O$ introduced from the first flow path 26 via the first diffusion layer 27 is used to cause an oxidation reaction of $H_2O$. That is, $O_2$ gas and $H^+$ are produced as expressed by the formula (1A). $O_2$ gas is discharged to the first flow path 26. $H^+$ moves in the first ion exchange membrane 29 and reaches the second flow path 30. In the vicinity of the third electrode 31 of the first electrolytic part 22, $H^+$ of the second flow path 30 and $CO_2$ introduced from the third flow path 33 via the third diffusion layer 32 are used to cause a reduction reaction of $CO_2$. That is, CO expressed in formula (2A) is produced. The produced CO and $CO_2$ move through the pipe 49 to reach the fourth flow path 39.

In the vicinity of the fourth electrode 44 of the second electrolytic part 23, $H_2O$ introduced from the sixth flow path 46 via the fourth diffusion layer 45 is used to cause an oxidation reaction of $H_2O$. That is, $O_2$ gas and $H^+$ are produced as expressed in the formula (1A). The $O_2$ gas is discharged to the sixth flow path 46. $H^+$ moves in the second ion exchange membrane 43 and reaches the fifth flow path 42. In the vicinity of the second electrode 41 of the second electrolytic part 23, $H^+$ of the fifth flow path 42 and CO and $CO_2$ as flow gas introduced from the fourth flow path 39 via the second diffusion layer 40 are used to cause a reduction reaction of CO and $CO_2$. For example, ethanol or ethylene is produced. Supplying CO in this manner to the vicinity of the second electrode 41 in addition to $CO_2$ can increase the amount of producing ethanol or ethylene.

Figure 8:
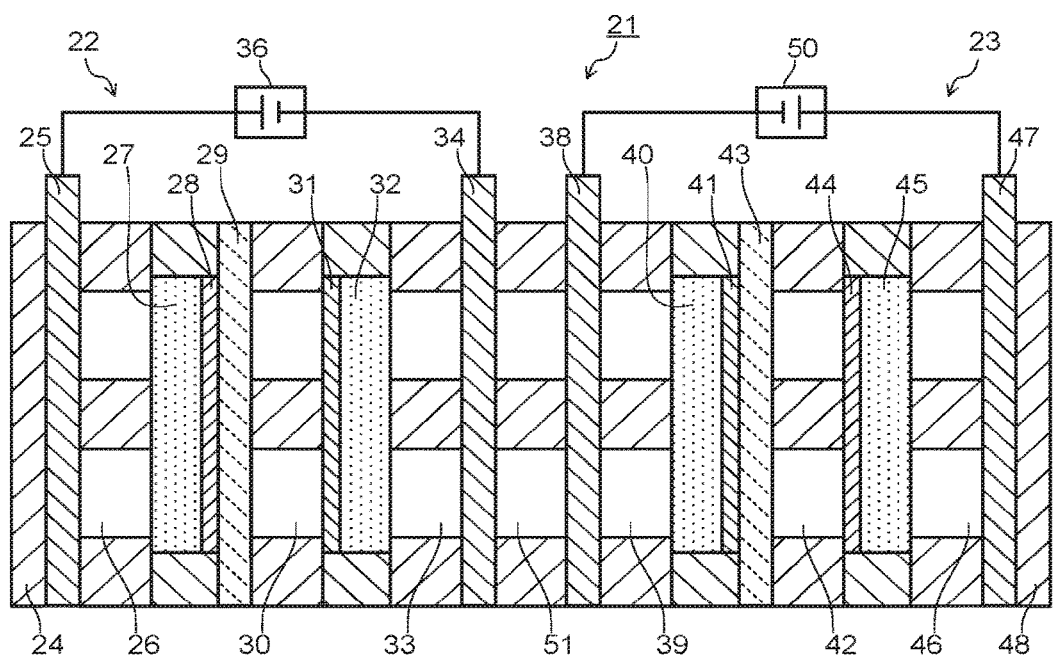
FIG. 8 is a diagram illustrating a first modification example of the electrolytic device according to the second embodiment.

In the electrolytic device 21 of the second embodiment, the third collector plate 34 and the second collector plate 38 may be connected with a seventh flow path 51 as illustrated in FIG. 8. In this case, placing of the second support plate 35, the third support plate 37, and the pipe 49 in FIG. 7 is omitted. The first support plate 24 and the fourth support plate 48 are used to sandwich the above-described composing members from both sides, so as to support a stack structure of the composing members. The third collector plate 34 and the second collector plate 38 are provided with a movement path of porous, mesh, fine pores, or the like capable of moving substances.

The movement path provided on the third collector plate 34 and the second collector plate 38 and the seventh flow path 51 can supply substances produced by a reduction reaction of $CO_2$ in the vicinity of the third electrode 31, for example, CO and $CO_2$ as flow gas from the third flow path 33 to the vicinity of the second electrode 41 via the third collector plate 34, the seventh flow path 51, the second collector plate 38, the fourth flow path 39, and the second diffusion layer 40. In this case, as compared to the electrolytic device 21 illustrated in FIG. 7, omitting the pipe 49 makes the moving distance of substances short, which can improve the movement efficiency of substances. Further, by filling a solution absorbing $CO_2$, for example, a solution of hydroxide such as NaOH and KOH or amine or the like in the seventh flow path 51, it is possible to make mainly CO move to the fourth flow path 39.

Figure 9:
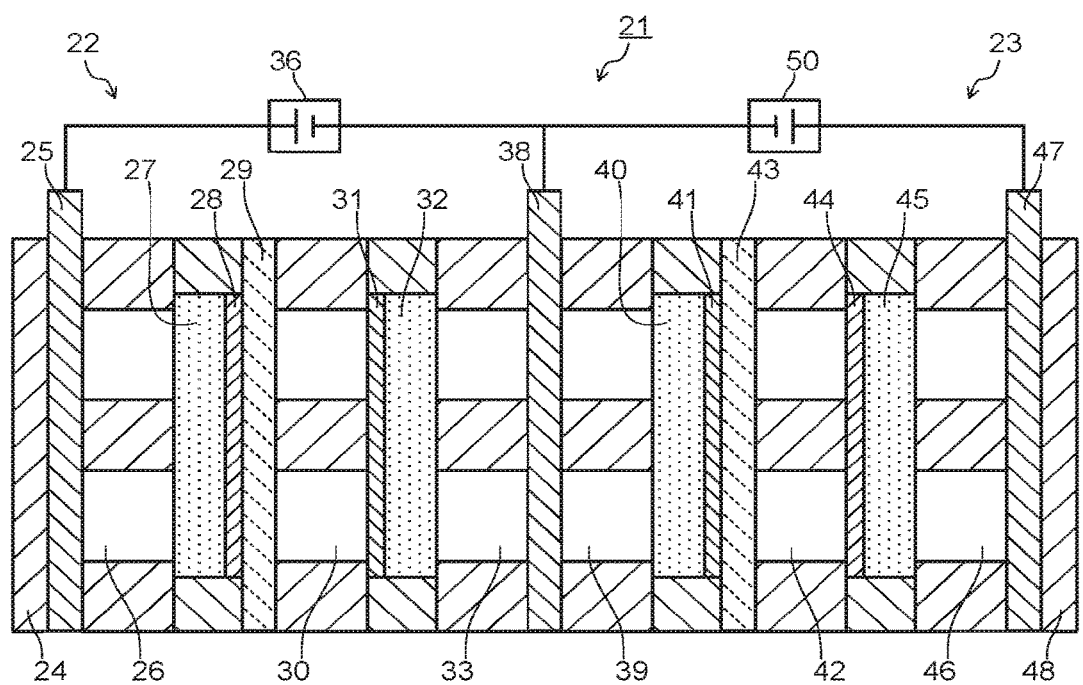
FIG. 9 is a diagram illustrating a second modification example of the electrolytic device according to the second embodiment.
Figure 10:
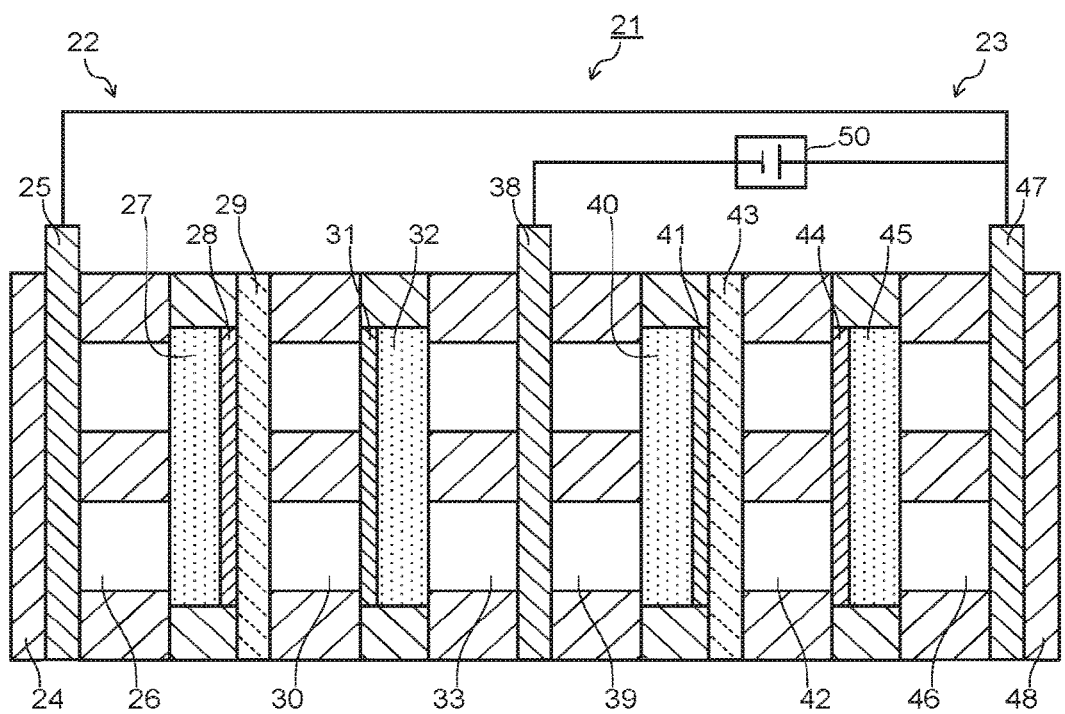
FIG. 10 is a diagram illustrating a third modification example of the electrolytic device according to the second embodiment.

In the electrolytic device 21 of the second embodiment, placing of the third collector plate 34 and the seventh flow path 51 may be omitted to use the second collector plate 38 as a common collector plate, as illustrated in FIG. 9. The third electrode 31 and the second electrode 41 are supplied with current from the second collector plate 38. The second collector plate 38 is provided with a movement path of porous, mesh, fine pores, or the like capable of moving substances. This movement path of the second collector plate 38 enables to supply substances, for example CO and $CO_2$ as flow gas, produced by the reduction reaction of $CO_2$ in the vicinity of the third electrode 31 to the vicinity of the second electrode 41 from the third flow path 33 via the second collector plate 38, the fourth flow path 39, and the second diffusion layer 40. In this case, the moving distance of substances further becomes short as compared to the electrolytic device 21 illustrated in FIG. 8, and thus movement efficiency of substances can be improved further. As illustrated in FIG. 10, moreover, connecting the first power supply 50 and the first collector plate 25 can omit placing of the second power supply 36. This can reduce loss by the power supply.

Third Embodiment

Figure 11:
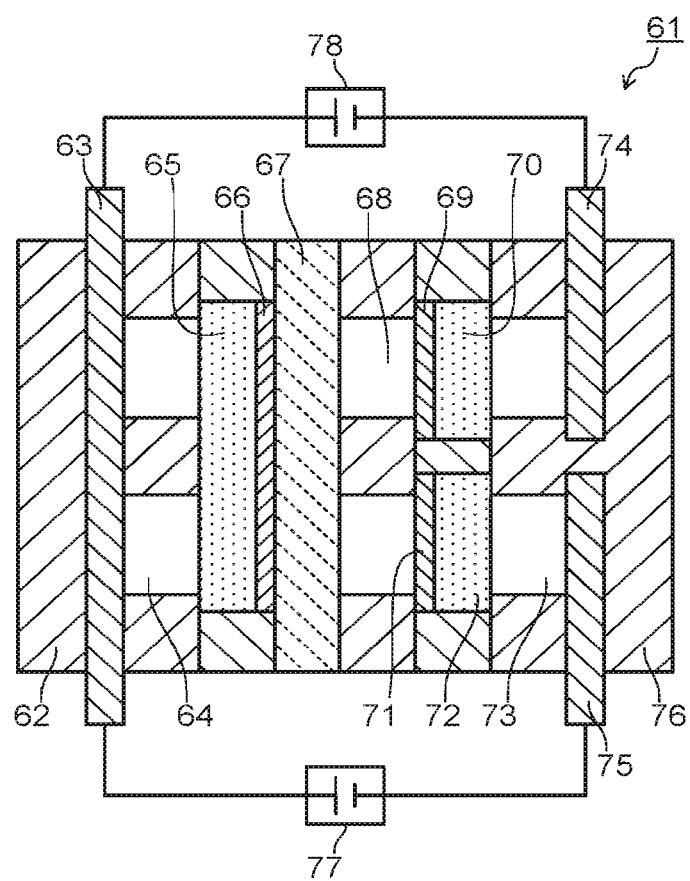
FIG. 11 is a diagram illustrating an electrolytic device according to a third embodiment.

An electrolytic device of a third embodiment will be explained with reference to FIG. 11 and FIG. 12. FIG. 11 is a diagram illustrating an electrolytic device 61 according to the third embodiment. The electrolytic device 61 illustrated in FIG. 11 has a first support plate 62, a first collector plate 63, a first flow path 64, a first diffusion layer 65, a first electrode 66, an ion exchange membrane 67, a second flow path 68, a second electrode 69, a second diffusion layer 70, a third electrode 71, a third diffusion layer 72, a third flow path 73, a second collector plate 74, a third collector plate 75, and a second support plate 76. The flow paths 64, 68, 73 can be provided with input-output ports for gas or solution, which are not illustrated. Note that the components are the same as those of the first or second embodiment.

The first support plate 62 and the second support plate 76 are used to sandwich the above-described composing members from both sides, so as to support a stacking structure of the composing members. The first collector plate 63 is used for applying current to the first electrode 66 via the first flow path 64 and the first diffusion layer 65. A solution or gas containing $H_2O$ is introduced into the first flow path 64. The solution or gas containing $H_2O$ is supplied to the first electrode 66 via the first diffusion layer 65. The third collector plate 75 is used for applying current to the third electrode 71 via the third flow path 73 and the third diffusion layer 72. A solution or gas containing $CO_2$ is introduced into the third flow path 73. The solution or gas containing $CO_2$ is supplied to the third electrode 71 via the third diffusion layer 72. The first collector plate 63 and the third collector plate 75 are connected to a second power supply 77. An input port for gas containing $CO_2$ is preferred to be provided in a position close to the third electrode 71.

The second collector plate 74 is used for applying current to the second electrode 69 via the third flow path 73 and the second diffusion layer 70. The first collector plate 63 and the second collector plate 74 are connected to a first power supply 78. The second electrode 69 is supplied with the $CO_2$ gas introduced into the third flow path 73 and a gaseous substance such as CO produced on the third electrode 71 via the second diffusion layer 70. When a substance in a liquid state is produced on the third electrode 71, it is supplied to the second electrode 69 via the second flow path 68. Further, in order to control the current, a not-illustrated reference electrode may be provided in the first flow path 64 or the second flow path 68. Further, a solution containing $H_2O$ is introduced into the second flow path 68. The solution introduced into the second flow path 68 may contain $CO_2$. Since $CO_2$ is supplied via the third diffusion layer 72, the solution introduced into the second flow path 68 need not contain $CO_2$. The second flow path 68 is provided as necessary and disposing thereof may be omitted.

Providing the third electrode 71 as described above and supplying CO and the like produced in the vicinity of the third electrode 71 and $CO_2$ as flow gas to the vicinity of the second electrode 69 can increase the production amount of ethanol, ethylene, and the like.

Figure 12:
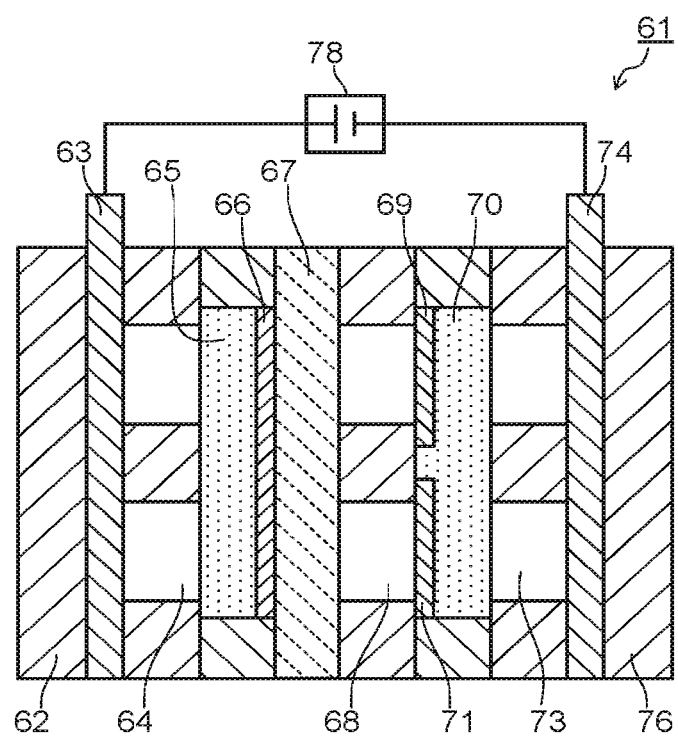
FIG. 12 is a diagram illustrating a modification example of the electrolytic device according to the third embodiment.

In the electrolytic device 61 of the third embodiment, as illustrated in FIG. 12, the third diffusion layer 72 and the third collector plate 75 may be omitted, the second diffusion layer 70 may be used as a common diffusion layer to the second electrode 69 and the third electrode 71, and the second collector plate 74 may be used as a common collector plate for the second electrode 69 and the third electrode 71. The second collector plate 74 is used for applying current to the third electrode 71 and the second electrode 69 via the third flow path 73 and the second diffusion layer 70. Gas containing $CO_2$ is introduced into the third flow path 73. The gas containing $CO_2$ is supplied to the third electrode 71 via the second diffusion layer 70. The first collector plate 63 and the second collector plate 74 are connected to the first power supply 78.

By thus providing the second electrode 69 and the third electrode 71 in the second diffusion layer 70 and connecting the first power supply 78 between the first collector plate 63 and the second collector plate 74, the number of power supplies is decreased so as to reduce loss in the power supply. Further, supplying CO and the like produced in the vicinity of the third electrode 71 and $CO_2$ as flow gas to the vicinity of the second electrode 69 can increase the production amount of ethanol, ethylene, and the like.

Next, examples of the present invention and evaluation results will be described.

Example 1

First, the electrolytic device 1 as illustrated in FIG. 4 was made as follows. Platinum wires were used for the first electrode and the fourth electrode. A Cu electrode was used as the second electrode. An Au electrode was used as the third electrode. The structure of the electrolytic bath, and so on is as illustrated in FIG. 4.

The second electrode was made as follows. First, Cu (with purity 6N) was cut out to make a substrate having 10 mm width×20 mm length×1 mm thickness. CuOx was formed on the surface of the Cu substrate in an electric furnace. This Cu substrate was immersed in a $KHCO_3$ aqueous solution of concentration 0.5 M, so as to electrochemically reduce CuOx to Cu, thereby forming a Cu nanowire structure on the surface of the Cu substrate. The Cu substrate having a Cu nanowire structure was processed using an epoxy resin into an electrode shape with an exposed region of 10 mm×10 mm on one side.

The third electrode was made as follows. First, an Au film having 10 mm width×20 mm length×100 μm thickness was prepared, and processed using an epoxy resin into an electrode shape with an exposed region of 10 mm×10 mm on one side. Next, it was immersed in a sulfuric acid electrolyte solution of concentration of 0.5 M, and a high frequency (high frequency of 0-2 V (vs. $Hg/HgSO_4$)) was applied such that the lowest potential of 1000 Hz is equal to or less than an oxidation potential of gold, and the highest potential is equal to or more than an oxidation potential of gold, thereby forming a porous structure.

After the above-described second electrode and third electrode were cleaned, they were placed in the second accommodating part of the electrolytic bath illustrated in FIG. 4. The distance between the second electrode and the third electrode was 10 mm or less. In the first accommodating part and the second accommodating part, a $KHCO_3$ aqueous solution of concentration 0.5 M was filled as an electrolytic solution. A Selemion (registered trademark) was used for the ion exchange film. The first electrode and the second electrode were connected to the first power supply, and further a reference electrode was connected thereto for potential control. The fourth electrode, the third electrode, and the reference electrode were connected to the second power supply. As the reference electrode, an Ag/AgCl reference electrode was used. A potentiostat was used as the first power supply and the second power supply. Further, $CO_2$ gas was introduced from the $CO_2$ gas port to the electrolytic solution in the second accommodating part.

Figure 13:
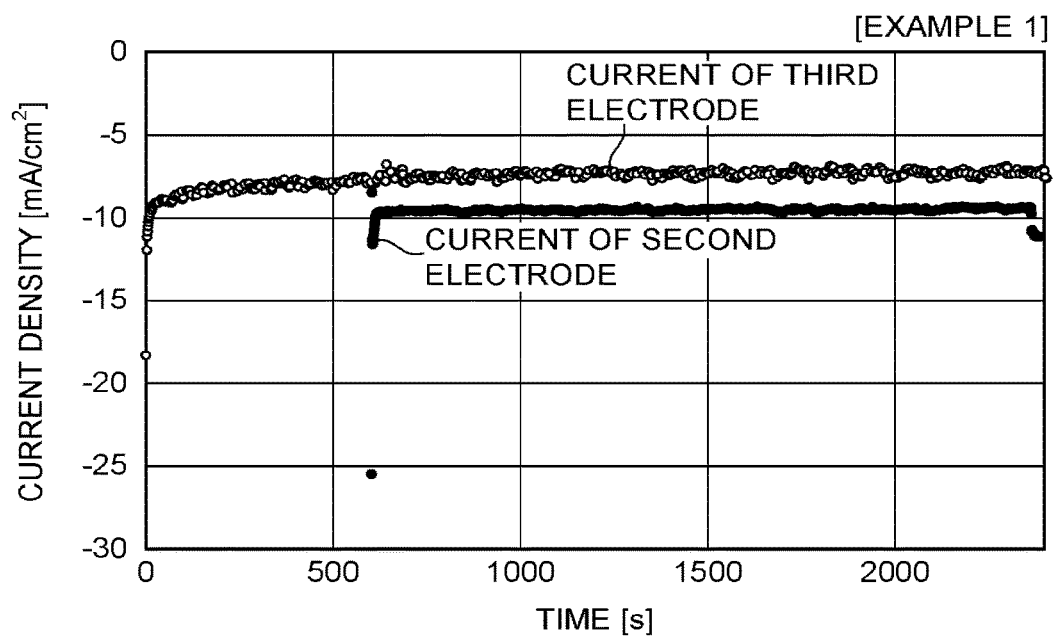
FIG. 13 is a diagram illustrating time dependence of current applied to electrodes in Example 1.

FIG. 13 illustrates time dependence of current applied to the second electrode and the third electrode. Current of approximately 7.5 mA/cm$^2$ was applied to the third electrode for 0 to 2400 seconds. Mainly CO was produced from $CO_2$ in the vicinity of the third electrode. On the other hand, current of approximately 9.4 mA/cm² was applied to the second electrode for 600 to 2400 seconds (1800 seconds). $C_2H_5OH$ was produced from CO in the vicinity of the third electrode. By thus applying the current to only the third electrode in advance, increase in CO amount in the electrolytic solution is expected. Therefore, it is possible to efficiently proceed the reduction reaction from CO to $C_2H_5OH$ in the vicinity of the third electrode.

Comparative Example 1

Figure 14:
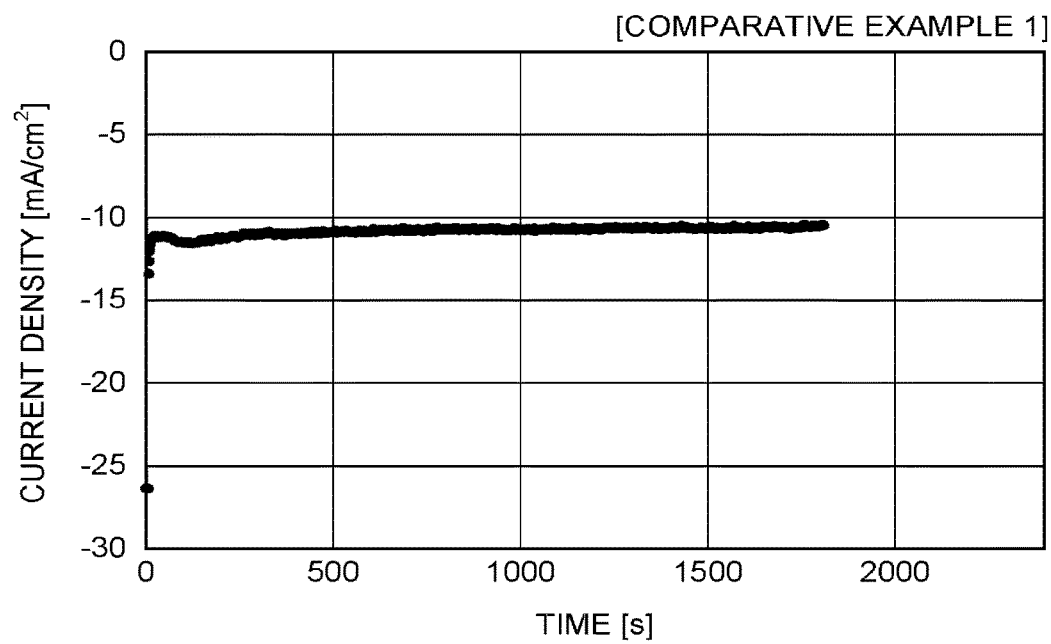
FIG. 14 is a diagram illustrating time dependence of current applied to an electrode in Example 1.

A reduction reaction of $CO_2$ was performed similarly to Example 1 except that the current is applied to only the second electrode and no current is applied to the third electrode. FIG. 14 illustrates time dependence of the current applied to the second electrode. In Comparative Example 1, current of approximately 11 mA/cm² was applied to the second electrode for 0 to 1800 seconds (1800 seconds).

The amounts of produced ethanol of Example 1 and Comparative Example 1 are presented in Table 2. As presented in Table 2, the amount of produced ethanol in Example 1 was clearly larger than in Comparative Example 1. Therefore, it was confirmed that the amount of produced ethanol increases by applying the current to the third electrode.

TABLE 2

| | The amount of produced ethanol [µM] |
|---|---|
| Example 1 | 71 |
| Comparative Example 1 | 53 |

It should be noted that the structures of the embodiments can each be applied in combination or can also be partly replaced. While several embodiments of the present invention have been described, these embodiments have been presented by way of example, and are not intended to limit the scope of the inventions. These embodiments may be embodied in a variety of other forms, and various omissions, substitutions and changes may be made without departing from the spirit of the inventions. These embodiments and their modifications are included in the scope and spirit of the present invention, and at the same time included in the inventions described in the claims and the range of equivalents thereof.

What is claimed is:

1. An electrolytic device comprising:
a first electrolytic cell comprising: a first electrode to oxidize water; a first flow path to pass a first fluid which is a solution or gas containing water so as to be in contact with the first electrode; a third electrode to reduce carbon dioxide to mainly produce a first carbon compound and disposed to allow ions migration from the first electrode; a second flow path to pass a second fluid which is a solution or gas containing carbon dioxide so as to be in contact with the third electrode; a first ion migration layer disposed between the first electrode and the third electrode: a first collector plate, and a second collector plate;
a second electrolytic cell comprising: a second electrode to reduce the first carbon compound and the carbon dioxide to mainly produce a second carbon compound; a third flow path to pass the second fluid containing the first carbon compound produced by the third electrode and the carbon dioxide so as to be in contact with the second electrode; a fourth electrode to oxidize water and disposed to allow ions migration from the second electrode; a fourth flow path to pass a third fluid which is a solution or gas containing water so as to be in contact with the fourth electrode; a second ion migration layer disposed between the second electrode and the fourth electrode; a third collector plate; and a fourth collector plate;
a transfer pathway to introduce the second fluid containing the first carbon compound and the carbon dioxide into the third flow path from the second flow path; and
a power supply to apply current between the first electrode and the third electrode and between the second electrode and the fourth electrode,
wherein the first electrolytic cell comprises a first stack in which the first collector plate, the first flow path, the first electrode, the first ion migration layer, the third electrode, the second flow path, and the second collector plate are stacked in this order,
the second electrolytic cell comprises a second stack in which the third collector plate, the third flow path, the second electrode, the second ion migration layer, the fourth electrode, the fourth flow path, and the fourth collector plate are stacked in this order,
the first stack and the second stack are stacked so as to oppose the second collector plate and the third collector plate through a fifth flow path in which the second fluid containing the first carbon compound and the carbon dioxide are introduced,
each of the second collector plate and the third collector plate has a porous shape, a mesh shape, or a fine pore shape as the transfer pathway so as to introduce the second fluid from the second flow path into the third flow path via the fifth flow path,
a composing material of the second electrode has an ionization tendency larger than a composing material of the third electrode, and
the third electrode mainly reduces the carbon dioxide to produce the first carbon compound, and the second electrode mainly reduces the first carbon compound to produce the second carbon compound.

2. The electrolytic device of claim 1, wherein the number of electrons used for reduction reaction to produce the first carbon compound from the carbon dioxide is smaller than the number of electrons used for reduction reaction to produce the second carbon compound from the carbon dioxide.

3. The electrolytic device of claim 2, wherein the first carbon compound contains carbon monoxide, and the second carbon compound contains at least one selected from the group consisting of ethanol and ethylene.

4. The electrolytic device of claim 1, wherein a composing material of the second electrode contains at least one selected from the group consisting of copper, nickel, zinc, indium, and tin, and a composing material of the third electrode contains at least one selected form the group consisting of gold, silver, platinum, and palladium.

5. The electrolytic device of claim 1, wherein a composing material of the second electrode contains copper, and a composing material of the third electrode contains at least one selected from the group consisting of gold and silver.

6. The electrolytic device of claim 1, wherein the power supply comprises a first power supply applying current across the fourth electrode and the second electrode, and a second power supply applying current across the first electrode and the third electrode.

7. The electrolytic device of claim 1, wherein
the first electrolytic cell further comprises a sixth flow path to pass a fourth fluid which is a solution or gas containing water and disposed between the first electrode and the third electrode, and
the second electrolytic cell further comprises a seventh flow path to pass a fifth fluid which is a solution or gas containing water and disposed between the second electrode and the fourth electrode.

8. The electrolytic device of claim 1, wherein a solution absorbing the carbon dioxide is filled in the fifth flow path.

9. The electrolytic device of claim 8, wherein the solution is at least one selected from the group consisting of: a solution of an alkali metal hydroxide; an amine solution.

10. An electrolytic device comprising:
a first electrolytic cell comprising: a first electrode to oxidize water; a first flow path to pass a first fluid which is a solution or gas containing water so as to be in contact with the first electrode; a third electrode to reduce carbon dioxide to mainly produce a first carbon compound and disposed to allow ions migration from the first electrode; a second flow path to pass a second fluid which is a solution or gas containing carbon dioxide so as to be in contact with the third electrode; a first ion migration layer disposed between the first electrode and the third electrode; and a first collector plate;
a second electrolytic cell comprising: a second electrode to reduce the first carbon compound and the carbon dioxide to mainly produce a second carbon compound; a third flow path to pass the second fluid containing the first carbon compound produced by the third electrode and the carbon dioxide so as to be in contact with the second electrode; a fourth electrode to oxidize water and disposed to allow ions migration from the second electrode; a fourth flow path to pass a third fluid which is a solution or gas containing water so as to be in contact with the fourth electrode; a second ion migration layer disposed between the second electrode and the fourth electrode; and a second collector plate;
a transfer pathway to introduce the second fluid containing the first carbon compound and the carbon dioxide into the third flow path from the second flow path; and
a power supply to apply current between the first electrode and the third electrode and between the second electrode and the fourth electrode,
wherein the first and second electrolytic cells further comprise a third collector plate which is common to the first and second electrolytic cells,
the first electrolytic cell comprises a first stack in which the first collector plate, the first flow path, the first electrode, the first ion migration layer, the third electrode, the second flow path, and the third collector plate are stacked in this order,
the second electrolytic cell comprises a second stack in which the third collector plate, the third flow path, the second electrode, the second ion migration layer, the fourth electrode, the fourth flow path, and the second collector plate are stacked in this order,
the first stack and the second stack are stacked through the third collector plate,
the third collector plate has a porous shape, a mesh shape, or a fine pore shape as the transfer pathway so as to introduce the second fluid containing the first carbon compound and the carbon dioxide from the second flow path into the third flow path,
a composing material of the second electrode has an ionization tendency larger than a composing material of the third electrode, and
the third electrode mainly reduces the carbon dioxide to produce the first carbon compound, and the second electrode mainly reduces the first carbon compound to produce the second carbon compound.

11. The electrolytic device of claim 10, wherein the first carbon compound contains carbon monoxide, and the second carbon compound contains at least one selected from the group consisting of ethanol and ethylene.

12. The electrolytic device of claim 10, wherein the composing material of the second electrode contains at least one selected from the group consisting of copper, nickel, zinc, indium, and tin, and the composing material of the third electrode contains at least one selected form the group consisting of gold, silver, platinum, and palladium.

13. The electrolytic device of claim 10, wherein the composing material of the second electrode contains copper, and the composing material of the third electrode contains at least one selected from the group consisting of gold and silver.

14. The electrolytic device of claim 10, wherein
the first electrolytic cell further comprises a fifth flow path to pass a fourth fluid which is a solution or gas containing water and disposed between the first electrode and the third electrode, and
the second electrolytic cell further comprises a sixth flow path to pass a fifth fluid which is a solution or gas containing water and disposed between the second electrode and the fourth electrode.

* * * * *